(12) United States Patent  (10) Patent No.: US 9,235,304 B2
Saitou et al.  (45) Date of Patent: Jan. 12, 2016

(54) DISPLAY DEVICE FOR IMPROVING DETECTION RESOLUTION

(71) Applicant: Japan Display Inc., Tokyo (JP)

(72) Inventors: Masanari Saitou, Tokyo (JP); Takahiro Miyazaki, Tokyo (JP); Shinji Sekiguchi, Tokyo (JP); Tomohiko Ootani, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 124 days.

(21) Appl. No.: 14/071,920

(22) Filed: Nov. 5, 2013

(65) Prior Publication Data

US 2014/0132557 A1  May 15, 2014

(30) Foreign Application Priority Data

Nov. 12, 2012 (JP) ................. 2012-248162

(51) Int. Cl.
  *G06F 3/044* (2006.01)
(52) U.S. Cl.
  CPC ...................... *G06F 3/044* (2013.01)
(58) Field of Classification Search
  CPC .................................................. G06F 3/03547
  USPC .......................................................... 345/173
  See application file for complete search history.

(56) References Cited

U.S. PATENT DOCUMENTS

| 8,482,545 | B2 * | 7/2013 | King-Smith et al. | 345/174 |
| 8,692,795 | B1 * | 4/2014 | Kremin et al. | 345/174 |
| 2012/0050217 | A1 * | 3/2012 | Noguchi et al. | 345/174 |

FOREIGN PATENT DOCUMENTS

JP  2011-81578  4/2011
JP  2011-238146  11/2011

* cited by examiner

*Primary Examiner* — Roy Rabindranath
(74) *Attorney, Agent, or Firm* — Lowe Hauptman & Ham, LLP (57) ABSTRACT

Disclosed is a touch panel-equipped display device capable of suppressing an increase in the number of wires and improving detection resolution. A touch panel-equipped display device includes scanning lines and detection lines. The detection lines include first main detection lines, second main detection lines, first one-side sub-detection lines, and first other-side sub-detection lines. Each of the second main detection lines is arranged between adjacent first main detection lines. The first one-side sub-detection lines are connected together, and each first one-side sub-detection lines is arranged between the corresponding first main detection line and the second main detection line adjacent to one side of the corresponding first main detection line. The first other-side sub-detection lines are connected together, and each first other-side sub-detection lines is arranged between the corresponding first main detection lines and the second main detection line adjacent to the other side of the corresponding first main detection line.

9 Claims, 8 Drawing Sheets

|  | state1 | state2 | state3 |
|---|---|---|---|
| ML(M) | DETECT | $H_i- Z$ | $H_i- Z$ |
| SLA | $H_i- Z$ | DETECT | $H_i- Z$ |
| SLB | $H_i- Z$ | DETECT | $H_i- Z$ |
| SLC | $H_i- Z$ | $H_i- Z$ | DETECT |
| SLD | $H_i- Z$ | $H_i- Z$ | DETECT |
| DE | float | float | float |

PRIOR ART

FIG.8

PRIOR ART

DISPLAY DEVICE FOR IMPROVING DETECTION RESOLUTION

CROSS-REFERENCE TO RELATED APPLICATION

The present application claims priority from Japanese application JP 2012-248162 filed on Nov. 12, 2012, the content of which is hereby incorporated by reference into this application.

BACKGROUND OF THE INVENTION

1. Field of the Invention

The present invention relates to a touch panel-equipped display device, and in particular, to improvement of touch detection resolution of a touch panel using an electrostatic capacitance system.

2. Description of the Related Art

A touch panel using an electrostatic capacitance system may be used as a touch panel for a touch panel-equipped display device. In this touch panel, of capacitance to be generated between scanning electrodes (scanning lines) arranged in a lattice shape inside a display region and detection electrodes (detection lines), fringe component capacitance differs between when the panel is touched and when the panel is not touched, and a panel touch position is detected on the basis of the difference in fringe component capacitance. A touch panel-equipped display device using an electrostatic capacitance system is disclosed in, for example, JP2011-81578A and JP2011-238146A.

Figure 7:
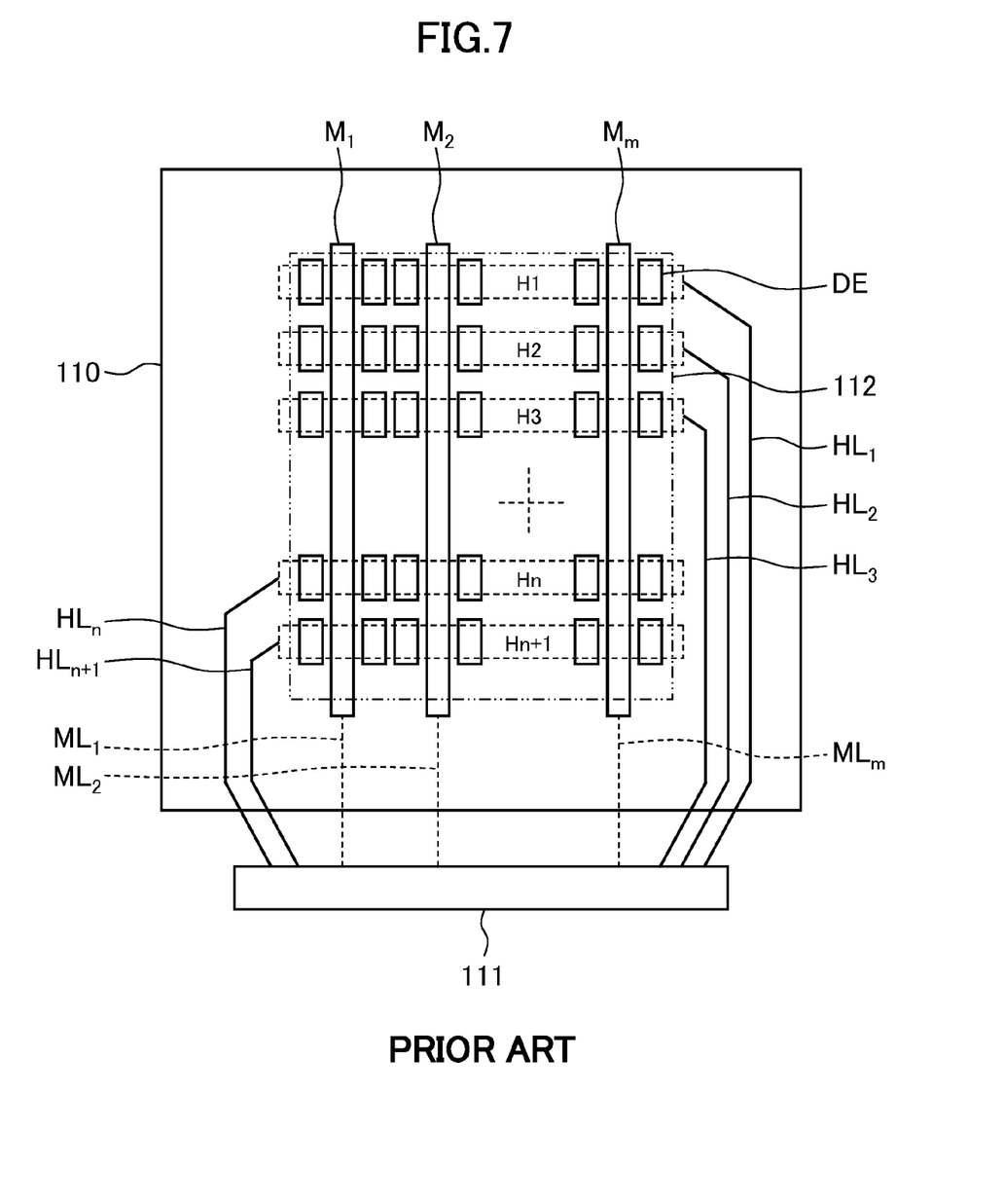
FIG. 7 is a schematic plan view showing the configuration of a touch panel substrate in a touch panel-equipped display device according to the related art.

FIG. 7 is a schematic plan view showing the configuration of a touch panel substrate 110 provided in a touch panel-equipped display device according to the related art. The display device includes the touch panel substrate 110. A plurality of detection lines which extend in the vertical direction of the drawing are provided on the front surface of the touch panel substrate 110, and a plurality of scanning lines which extend in a horizontal direction of the drawing are provided on the rear surface of the touch panel substrate. In the drawing, the plurality of detection lines are represented as $M_1$, $M_2$, ..., and $M_m$, and the plurality of scanning lines are represented as $H_1$, $H_2$, ..., $H_n$, and $H_{n+1}$. The display device is provided with a touch panel drive IC 111, and the touch panel drive IC 111 is connected to the plurality of detection lines through a plurality of corresponding detection wires and is connected to the plurality of scanning lines through a plurality of corresponding scanning wires. In the drawing, the plurality of detection wires are represented as $ML_1$, $ML_2$, ..., and $ML_m$, and the plurality of scanning wires are represented as $HL_1$, $HL_2$, ..., $HL_n$, and $HL_{n+1}$. Regions where the plurality of detection lines and the plurality of scanning lines overlap each other overlap an effective display region 112 of the display panel of the display device in plan view. The plurality of detection wires and the plurality of scanning wires are arranged in a frame region of the touch panel substrate around the region which overlaps the effective display region 112 in plan view. A plurality of dummy electrodes DE are arranged on both sides of each of the plurality of detection lines, and the plurality of dummy electrodes DE are in an electrically floating state.

SUMMARY OF THE INVENTION

The detection resolution of the touch panel is determined by the size (pitch) of each lattice grid of the detection lines and the scanning lines. In the related art, in order to improve the detection resolution over the lattice grid, a complicated software process is required. In order to increase the detection resolution with no complicated software process, it is necessary to reduce the pitch of the lattice grids, and to this end, it is considered to reduce the pitch (interval) of the detection lines. In this case, a region which becomes a gap between adjacent detection lines is reduced, and fringe capacitance to be generated through the region is reduced, causing degradation in detection sensitivity. For this reason, it is not desirable to reduce the pitch of the detection lines in the detection of panel touch.

With the reducing pitch of the detection lines and the increasing number of detection lines, the number of detection wires (lead-out lines) for connection to the touch panel drive IC 111 increases, a region necessary for arranging a plurality of detection wires increases, and it is not desirable for reduction of the frame region.

The invention has been accomplished in consideration of the above-described problem, and an object of the invention is to provide a touch panel-equipped display device capable of suppressing an increase in the number of wires and improving detection resolution.

(1) A display device according to an aspect of the invention includes a plurality of scanning lines which overlap a display region in plan view, extend in a first direction, and are arranged in a second direction intersecting the first direction, and a plurality of detection lines which overlap the display region in plan view, intersect a plurality of scanning lines in a three-dimensional manner, extend in the second direction, and are arranged in the first direction. The plurality of detection lines include a plurality of first main detection lines, a plurality of second main detection lines, a plurality of first one-side sub-detection lines, and a plurality of first other-side sub-detection lines. Each of the plurality of second main detection lines is arranged between adjacent first main detection lines. The plurality of first one-side sub-detection lines are connected together. Each of the plurality of first one-side sub-detection lines is arranged between the corresponding first main detection lines and the second main detection line adjacent to one side of the corresponding first main detection line. The plurality of first other-side sub-detection lines are connected together. Each of the plurality of first other-side sub-detection lines is arranged between the corresponding first main detection lines and the second main detection line adjacent to the other side of the corresponding first main detection line.

(2) In the display device described in (1), a plurality of detection lines may further include a plurality of second one-side sub-detection lines and a plurality of second other-side sub-detection lines. The plurality of second one-side sub-detection lines may be connected together. Each of the plurality of second one-side sub-detection lines may be arranged between the corresponding second main detection lines and the first other-side sub-detection line adjacent to one side of the corresponding second main detection line. The plurality of second other-side sub-detection lines may be connected together. Each of the plurality of second other-side sub-detection lines may be arranged between the corresponding second main detection lines and the first one-side sub-detection line adjacent to the other side of the corresponding second main detection line.

(3) The display device described in (1) or (2) may further include a drive circuit which is connected to a plurality of scanning lines and a plurality of detection lines and drives a plurality of scanning lines and a plurality of detection lines to detect panel touch. When panel touch is detected using a plurality of first main detection lines and a plurality of second main detection lines, the drive circuit may place a plurality of sub-detection lines in a high impedance state.

(4) The display device described in (1) may further include a drive circuit which is connected to a plurality of scanning lines and a plurality of detection lines and drives a plurality of scanning lines and a plurality of detection lines to detect panel touch. When panel touch is detected using the plurality of first one-side sub-detection lines and/or the plurality of first other-side sub-detection lines, the drive circuit may place the plurality of main detection lines and the plurality of sub-detection lines not used for detection in a high impedance state.

(5) The display device described in (2) may further include a drive circuit which is connected to a plurality of scanning lines and a plurality of detection lines and drives a plurality of scanning lines and a plurality of detection lines to detect panel touch. When panel touch is detected using a plurality of second one-side sub-detection lines and/or a plurality of second other-side sub-detection lines, the drive circuit may place a plurality of main detection lines and a plurality of sub-detection lines not used for detection in a high impedance state.

According to the invention, a touch panel-equipped display device capable of suppressing an increase in the number of wires and improving detection resolution is provided.

DETAILED DESCRIPTION OF THE INVENTION

Hereinafter, an embodiment of the invention will be described specifically and in detail referring to the drawings. In all drawings for describing the embodiment, members having the same functions are represented by the same reference numerals, and repetitive description thereof will be omitted. The drawings described below are merely for description of examples of the embodiment, and the size illustrated in the drawings does not necessarily match the scale described in the examples.

Figure 1:
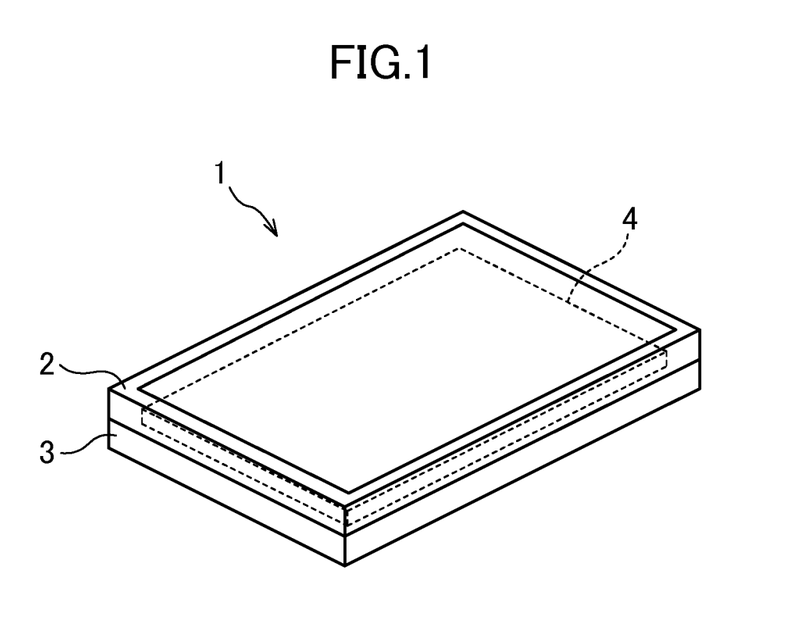
FIG. 1 is a schematic perspective view of a touch panel-equipped display according to an embodiment of the invention.

FIG. 1 is a schematic perspective view of a touch panel-equipped display 1 according to an embodiment of the invention. As shown in the drawing, the touch panel-equipped display 1 has an upper frame 2, a lower frame 3, and a touch panel-equipped liquid crystal display panel 4 sandwiched and fixed between the upper frame 2 and the lower frame 3.

The touch panel-equipped liquid crystal display panel 4 is, for example, an in-plane switching (IPS) system liquid crystal display panel. The touch panel-equipped liquid crystal display panel 4 includes a backlight, a TFT substrate, a color filter substrate, and a liquid crystal layer sandwiched between the TFT substrate and the color filter substrate. The touch panel-equipped liquid crystal display panel 4 according to the embodiment is provided with a touch panel substrate 10 (not shown) on the surface of the TFT substrate. That is, the display device is a display device which includes an in-cell touch panel, and the touch panel uses a projection electrostatic capacitance system.

Figure 2:
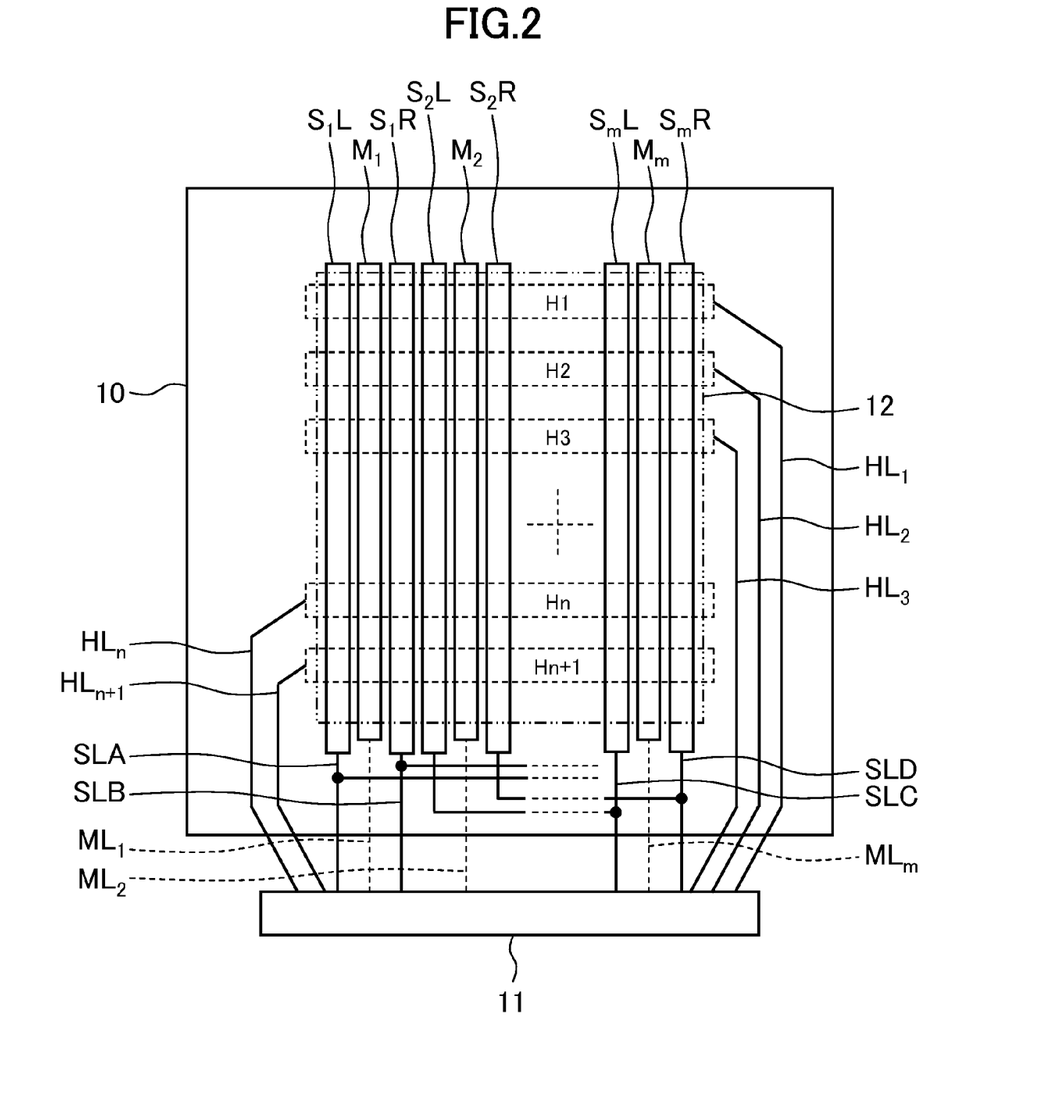
FIG. 2 is a schematic plan view showing the configuration of a touch panel substrate provided in the touch panel-equipped display device according to the embodiment of the invention.

FIG. 2 is a schematic plan view showing the configuration of the touch panel substrate 10 in the touch panel-equipped display device 1 according to this embodiment. A plurality of scanning lines H (scanning electrodes) which extend in a horizontal direction (first direction) and are arranged in a vertical direction (second direction) intersecting the horizontal direction are provided on a rear surface (on a TFT substrate side) of the touch panel substrate 10, and a plurality of detection lines (detection electrodes) which extend in the vertical direction (second direction) and are arranged in the horizontal direction (first direction) are provided on a front surface (on a color filter substrate side) of the touch panel substrate 10. It is desirable that the second direction is orthogonal to the first direction. It is desirable that the plurality of detection lines are arranged closer to a panel surface, on which a touch operation is made, than the plurality of scanning lines, but the invention is not limited thereto.

In the touch panel-equipped display device 1, a touch panel drive IC 11 (drive circuit) is provided outside the touch panel substrate 10, and the touch panel drive IC 11 is connected to the plurality of detection lines through a plurality of corresponding detection wires and is connected to the plurality of scanning lines H through a plurality of corresponding scanning wires HL. The touch panel drive IC 11 drives the plurality of scanning lines and the plurality of detection lines to detect panel touch. The plurality of scanning lines and the plurality of detection lines overlap each other in plan view, and a region of the touch panel substrate 10 where the plurality of scanning lines and the plurality of detection lines are arranged overlaps an effective display region 12 (display region) of the touch panel-equipped liquid crystal display panel 4 in plan view. In the drawing, the plurality of scanning lines H are represented as $H_1, H_2, \ldots, H_n$, and $H_{n+1}$, and the plurality of scanning wires HL are represented as $HL_1, HL_2, \ldots, HL_n$, and $HL_{n+1}$. The plurality of scanning lines are arranged on the rear surface of the touch panel substrate 10 and can double as common electrode lines (common lines) of pixel circuits in the TFT substrate.

The plurality of detection lines include a plurality of main detection lines M and a plurality of sub-detection lines S. The plurality of main detection lines M are lined up in the horizontal direction at a predetermined pitch (interval), and in the drawing, are represented as main detection lines $M_1, M_2, \ldots, M_m$ in order from left. In general, a j-th main detection line M from left is represented by $M_j$. A left-side sub-detection line $S_jL$ and a right-side sub-detection line $S_jR$ are arranged to be adjacent to each other on both sides of each main detection line $M_j$. An odd-numbered (where j is an odd number) main detection line $M_j$ is referred to as an odd main detection line (first main detection line), and an even-numbered (where j is an even number) main detection line $M_j$ is referred to as an even main detection line (second main detection line). A sub-detection line which is arranged on the left side (one side) of the odd main detection line is referred to as a left-side odd sub-detection line (first one-side sub-detection line), and a sub-detection line which is arranged on the right side (the other side) of the odd main detection line is referred to as a right-side odd sub-detection line (first other-side sub-detection line). Similarly, a sub-detection line which is arranged on the left side of the even main detection line is referred to as a left-side even sub-detection line (second one-side sub-detection line), and a sub-detection line which is arranged on the right side of the even main detection line is referred to as a right-side even sub-detection line (second other-side sub-detection line). That is, the even main detection line is arranged between adjacent odd main detection lines, and the odd main detection lines and the even main detection lines are repetitively arranged in the horizontal direction. When j is an odd number, the left-side odd sub-detection line (left-side sub-detection line $S_jL$) is arranged between the odd main detection line (main detection line $M_j$) and the even main detection line (main detection line $M_{j-1}$) adjacent to the left side of the odd main detection line (main detection line $M_j$), and is arranged on the left side of the odd main detection line (main detection line $M_j$) to be closer to the odd main detection line than an adjacent even main detection line (main detection line $M_{j-1}$). The right-side odd sub-detection line (right-side sub-detection line $S_jR$) is arranged between the odd main detection line (main detection line $M_j$) and the even main detection line (main detection line $M_{j+1}$) adjacent to the right side of the odd main detection line (main detection line $M_j$), and is arranged on the right side of the odd main detection line (main detection line $M_j$) to be closer to the odd main detection line than an adjacent even main detection line (main detection line $M_{j+1}$). Similarly, when j is an even number, a left-side even sub-detection line (left-side sub-detection line $S_jL$) is arranged between an even main detection line (main detection line $M_j$) and an odd main detection line (main detection line $M_{j-1}$) adjacent to the left side of the even main detection line (main detection line $M_j$), and a right side even sub-detection line (right-side sub-detection line $S_jR$) is arranged between the even main detection line (main detection line $M_j$) and an even main detection line (main detection line $M_{j+1}$) adjacent to the right side of the even main detection line (main detection line $M_j$). It is desirable that the right-side sub-detection line $S_{j-1}R$ and the left-side sub-detection line $S_jL$ which are arranged between adjacent main detection lines $M_{j-1}$ and $M_j$ are arranged so as to equally divide internally between the main detection lines $M_{j-1}$ and $M_j$. That is, the left-side odd sub-detection line, the odd main detection line, the right-side odd detection line, the left-side even sub-detection line, the even main detection line, and the right-side even detection line are repetitively lined up in the horizontal direction from left to right, and it is desirable that the interval between adjacent detection lines is the same. Note that the interval between adjacent detection lines is the distance between the central lines of adjacent detection lines.

The plurality of detection wires which connect the plurality of detection lines and the touch panel drive IC 11 include a plurality of main detection wires ML which are connected to the main detection lines M and a plurality of sub-detection wires which are connected to the sub-detection lines S. In the drawing, the plurality of main detection wires ML which are connected to the plurality of main detection lines $M_1$, $M_2$, ..., and $M_m$ are represented as $ML_1$, $ML_2$, ..., and $ML_m$. The plurality of left-side odd sub-detection lines are electrically connect together. Similarly, the plurality of right-side odd sub-detection lines are connected together, the plurality of left-side even sub-detection lines are connected together, and the plurality of right-side even sub-detection lines are connected together. Of the plurality of sub-detection wires, a sub-detection wire which is connected to the plurality of left-side odd sub-detection lines is referred to as a left-side odd sub-detection wire SLA, a sub-detection wire which is connected to the plurality of right-side odd sub-detection lines is referred to as a right-side odd sub-detection wire SLB, a sub-detection wire which is connected to a plurality of left-side even sub-detection lines is referred to as a left-side even sub-detection wire SLC, and a sub-detection wire which is connected to a plurality of right-side even sub-detection lines is referred to as a right-side even sub-detection wire SLD. Though not shown in FIG. 2 for simplification of description, practically, a plurality of dummy electrodes DE are arranged between the main detection lines and the sub-detection lines arranged on the touch panel substrate 10. The details of the dummy electrodes DE will be described below.

The primary feature of the embodiment of the invention resides in that the left-side sub-detection lines and the right-side sub-detection lines are arranged on both sides of the main detection lines, and the left-side sub-detection lines and the right-side sub-detection which are arranged on both sides of each of the even and odd main detection lines are connected together, respectively. A plurality of left-side odd sub-detection lines are connected together, making it possible to connect the touch panel drive IC 11 (drive circuit) arranged outside the touch panel substrate 10 and a plurality of left-side odd sub-detection lines through one left-side odd sub-detection wire SLA. The same applies to other sub-detection lines. With this configuration, it becomes possible to realize improvement of detection resolution while suppressing an increase in the number of wires.

Figure 3:
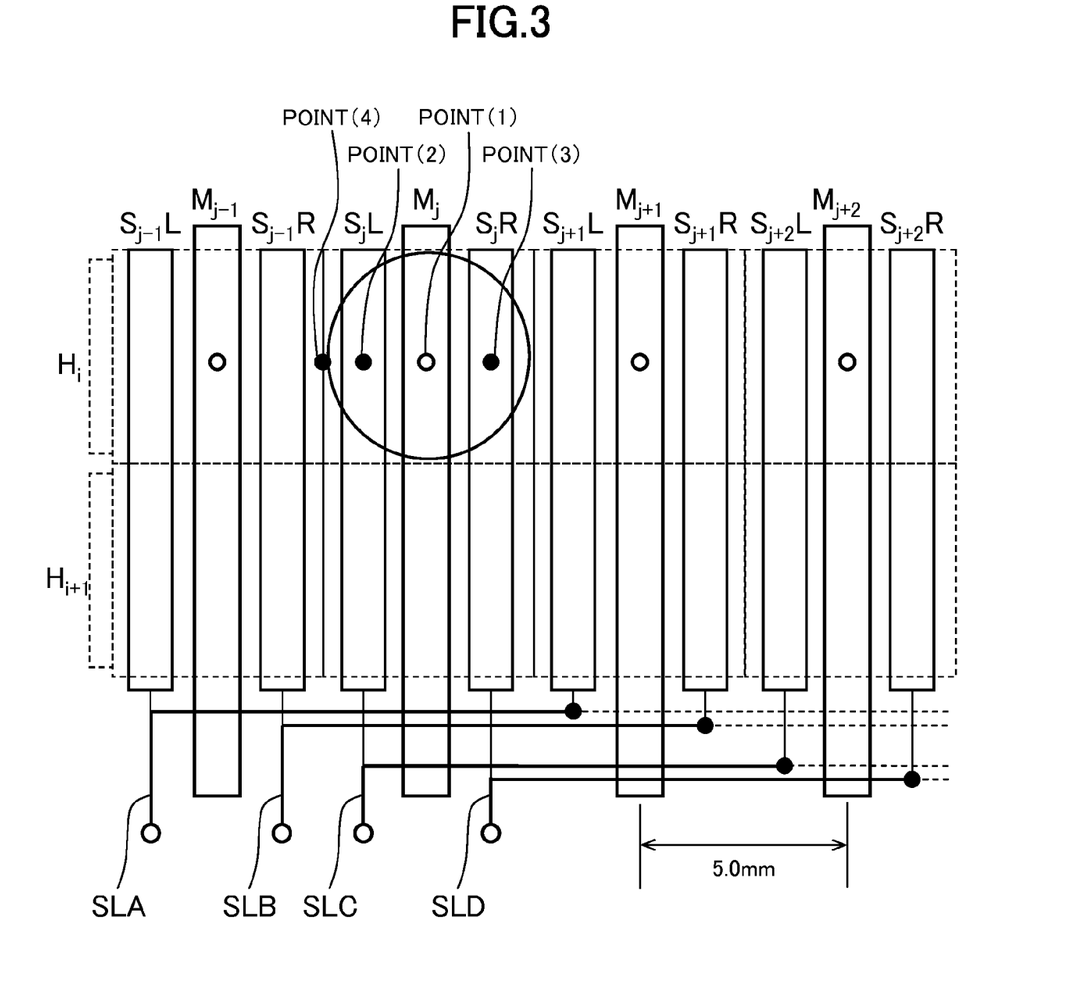
FIG. 3 is a schematic plan view showing the configuration of a main part of the touch panel substrate according to the embodiment of the invention.

FIG. 3 is a schematic plan view showing the configuration of a main part of the touch panel substrate 10 according to this embodiment. As shown in the drawing, the plurality of main detection lines $M_j$ are lined up in the horizontal direction at a predetermined pitch, and the predetermined pitch is 5.0 mm. The left-side sub-detection line $S_jL$ and the right-side sub-detection line $S_jR$ are arranged on both sides of the main detection line $M_j$. The drawing shows a case where the main detection line $M_j$ is the even main detection line (where j is an even number). That is, the left-side odd sub-detection wire SLA is connected to the plurality of left-side odd sub-detection lines (left-side sub-detection lines, ..., $S_{j-1}L$, $S_{j+1}L$, ...). Similarly, the right-side odd sub-detection wire SLB is connected to the plurality of right-side odd sub-detection lines (right-side sub-detection lines ..., $S_{j-1}R$, $S_{j+1}R$, ...), the left-side even sub-detection wire SLC is connected to the plurality of left-side even sub-detection lines (left-side sub-detection lines ..., $S_jL$, $S_{j+2}L$, ...), and the right-side even sub-detection wire SLD is connected to the plurality of right-side even sub-detection lines (right-side sub-detection line ..., $S_jR$, $S_{j+2}R$, ...). As shown in the drawing, the plurality of scanning lines are lined up in the vertical direction, and in the drawing, two scanning lines $H_i$ and $H_{i+1}$ are shown. A primary search of a touch position is performed by the plurality of main detection lines, and for example, it is assumed that the touch position near the j-th main detection line $M_j$ is detected. A secondary search of the touch position is performed using the left-side even sub-detection wire SLC and the right-side even sub-detection wire SLD, and as a result, it can be determined that the touch position is at any point of points (1) to (3) of the drawing. A circle centered on the point (1) shown in the drawing represents the detection resolution of the related art. In the primary search of the touch position, it may be determined that the touch position is at a point (4) in the middle of the (j−1)th main detection line $M_{j-1}$ and j-th main detection line $M_j$. Compared to the detection resolution of the related art, more detailed position detection is realized only by providing four sub-detection wires which are led out outside the touch panel substrate 10.

Figure 4:
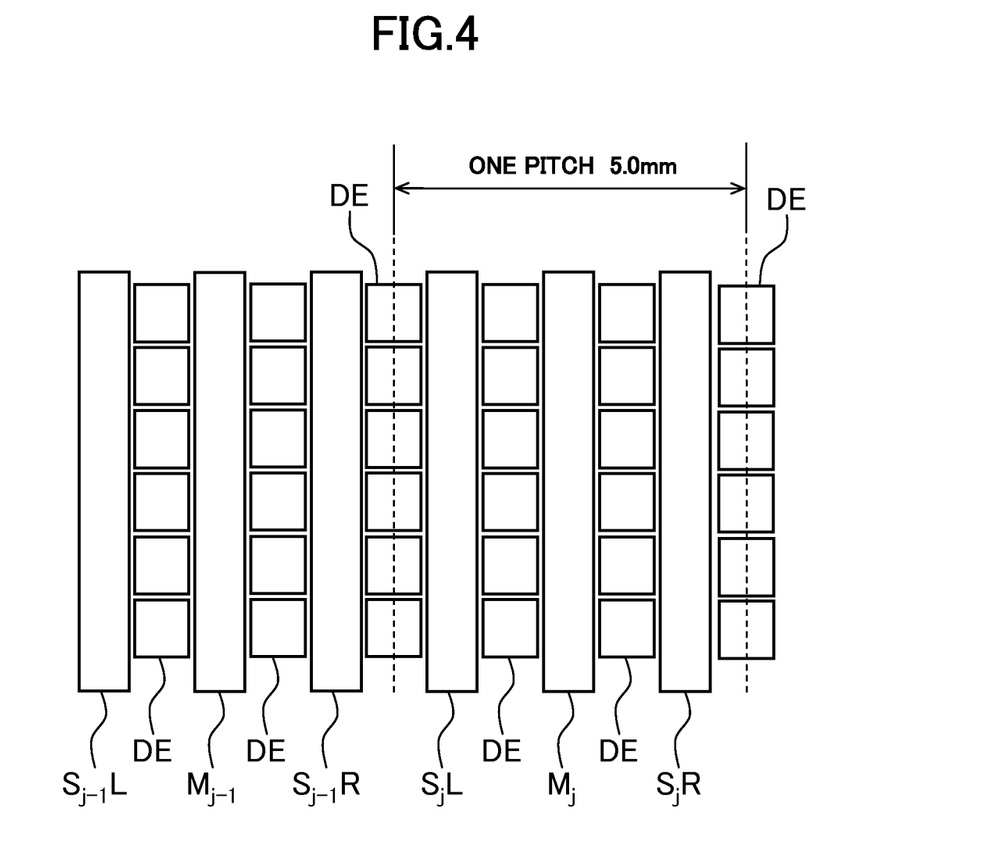
FIG. 4 is a schematic plan view showing the configuration of a main part of the touch panel substrate according to the embodiment of the invention.
Figure 8:
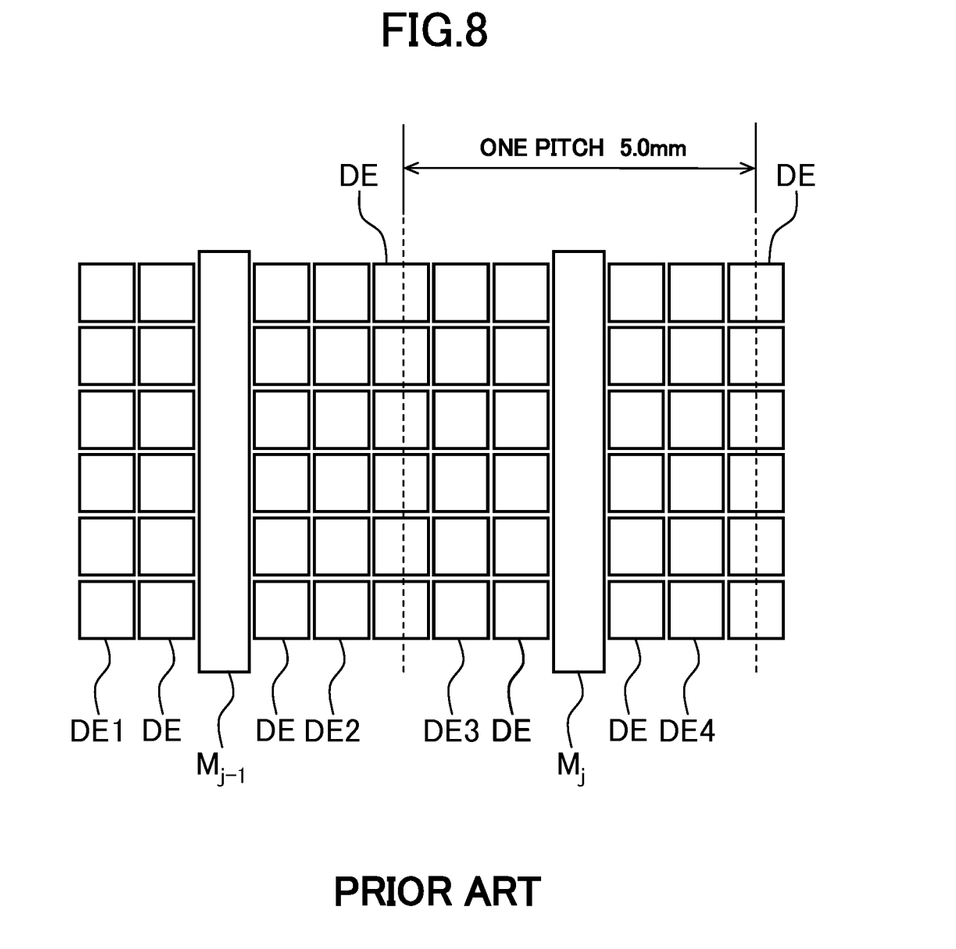
FIG. 8 is a schematic plan view showing the configuration of a main part of the touch panel substrate according to the related art.

FIG. 4 is a schematic plan view showing the configuration of a main part of the touch panel substrate 10 according to this embodiment. As described above, for simplification of description, although the dummy electrodes DE are not shown in FIGS. 2 and 3, practically, a plurality of rectangular dummy electrodes DE which are lined up in a line are arranged between adjacent main detection line and sub-detection line, and the plurality of dummy electrodes DE are in a floating state of being not electrically connected to other objects. The pitch of adjacent main detection lines is 5.0 mm, and the width of the main detection lines and the width of the sub-detection lines are about 1 mm (strictly, slightly smaller than 1 mm). The dummy electrodes DE have a rectangular shape, and in this case, a square shape having a side of about 1 mm. FIG. 8 is a schematic plan view showing the configuration of a main part of a touch panel substrate according to the related art, and a plurality of square dummy electrodes DE which are lined up in five lines are arranged between adjacent detection lines. For comparison, the dummy electrodes DE corresponding to a region where four sub-detection lines ($S_{j-1}L$, $S_{j-1}L$, and $S_jR$) according to this embodiment shown in FIG. 4 are provided are represented as DE1, DE2, DE3, and DE4.

In the touch panel using the electrostatic capacitance system, capacitance between the scanning line (scanning electrode) and the detection line (detection electrode) differs between when the panel is touched and when the panel is not touched, and the touch position of the panel is detected on the basis of the difference in capacitance. A pulsed voltage signal is applied to the scanning line, and an electric field (line of electric force) which extends from the scanning line to the detection line is generated in capacitance between the scanning line and the detection line. In a region where the scanning line and the detection line overlap each other in plan view, an electric field extends inside the touch panel substrate from the scanning line to the detection line. There is a region which becomes a gap between adjacent detection lines, and an electric field (fringe electric field) which passes through the region passes from the scanning line and reaches the detection line through the outside of the touch panel substrate. A finger is conductive, and if the panel is touched with the finger, since the electric field which passes through the region changes and reaches the finger, capacitance changes. Capacitance due to the region is fringe capacitance.

In a case of the touch panel substrate according to the related art, as shown in FIG. 8, there is a region which becomes a gap between adjacent detection lines. While the region is required for securing detection sensitivity of the touch panel, since the electrode pattern of the detection line is recognized by the human eye due to the region, the touch panel substrate according to the related art is not desirable for a display device. In order to suppress the recognition, the plurality of dummy electrodes DE are arranged. The dummy electrodes DE are in a floating state so as not to shield the fringe electric field.

Figure 5:
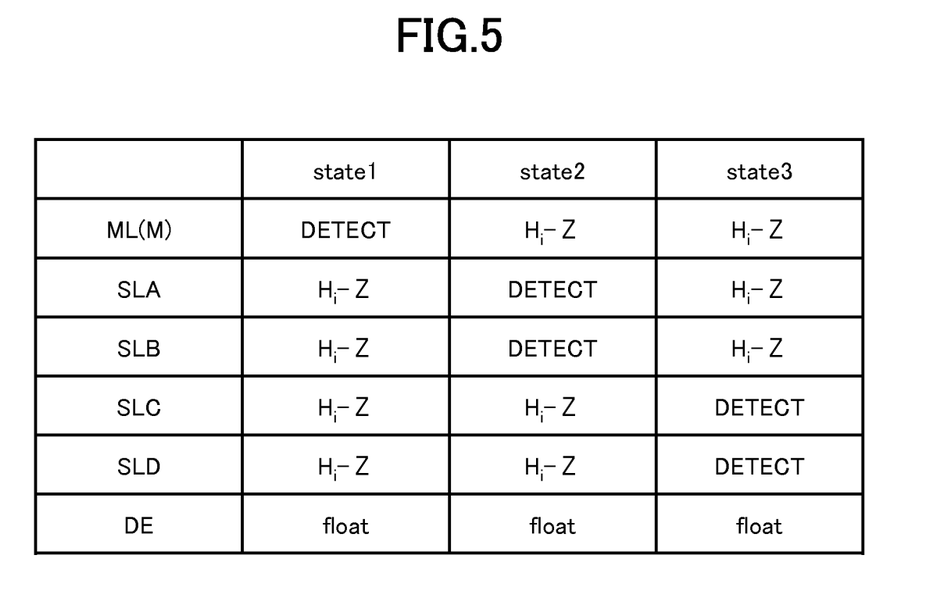
FIG. 5 is a diagram showing an electrical state of each detection line of touch position detection control according to the embodiment of the invention.

FIG. 5 is a diagram showing an electrical state of each detection line of touch position detection control according to this embodiment. In this embodiment, the touch panel drive IC 11 performs a primary search (state1) using the main detection lines and a secondary search (state2, state3) using the sub-detection lines to determine a panel touch position. During the primary search (state1), the touch panel drive IC 11 performs detection using all of the plurality of main detection lines, and at this time, the touch panel drive IC 11 places all of the plurality of sub-detection lines in a high impedance state (Hi-Z) so as not to electrically shield the fringe electric field. That is, the detection lines which do not perform a detection operation are placed in the Hi-Z state. In FIG. 5, the electrical state of the main detection line $M_j$ is the same as the main detection wire to which the main detection line $M_j$ is connected, and is represented as ML(M). The state of the sub-detection line is the same as the sub-detection wire to which the sub-detection line is connected, and the electrical states of the left-side odd sub-detection lines, the right-side odd sub-detection lines, the left-side even sub-detection lines, and the right-side even sub-detection lines are respectively represented as the left-side odd sub-detection wire SLA, the right-side odd sub-detection wire SLB, the left-side even sub-detection wire SLC, and the right-side even sub-detection wire SLD. The Hi-Z state refers to a state in which the drive IC 11 and each detection line are temporarily electrically separated from each other and impedance is high, and it is desirable that impedance is equal to or greater than tens of MΩ. Of the secondary search which is performed by the touch panel drive IC 11, during a search "state2" using odd sub-detection lines arranged on both sides of the odd main detection lines, the touch panel drive IC 11 places the plurality of main detection lines and the plurality of even sub-detection lines in the Hi-Z state. Similarly, of the secondary search, during a search "state3" using even sub-detection lines arranged on both sides of the even main detection lines, the touch panel drive IC 11 places the plurality of main detection lines and the plurality of odd sub-detection lines in the Hi-Z state. As described above, the dummy electrodes DE are maintained in the floating state.

Figure 6:
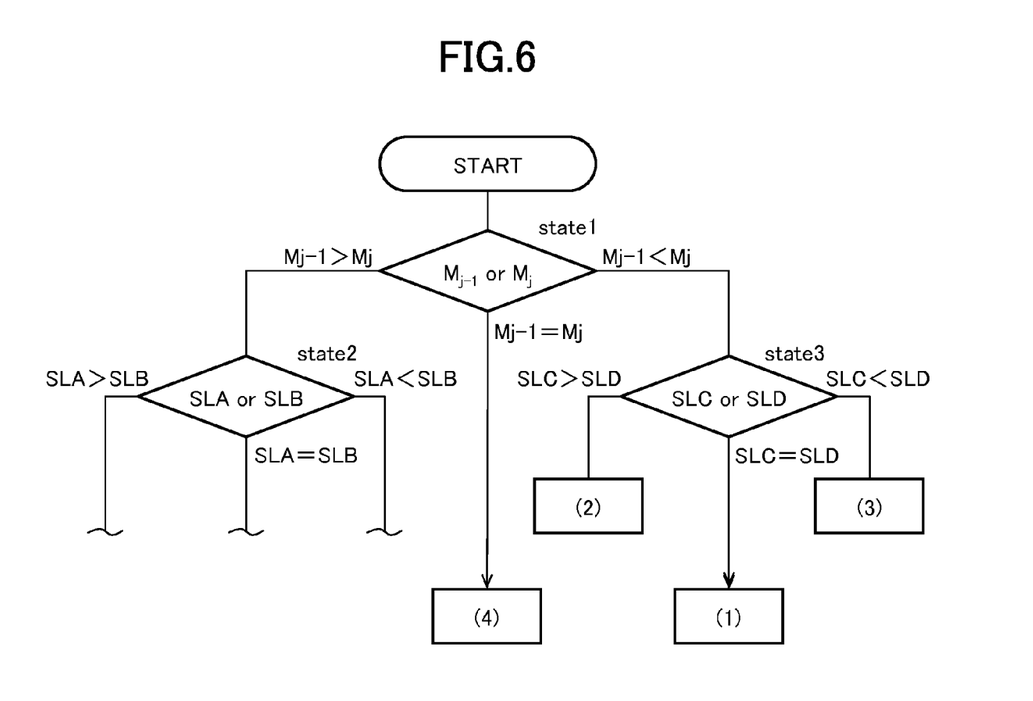
FIG. 6 is a flowchart showing a panel touch position detection control method according to the embodiment of the invention.

FIG. 6 is a flowchart showing a panel touch position detection control method according to this embodiment. As shown in FIG. 3, a case where the main detection line $M_j$ is an even main detection line (where j is an even number) is shown. First, in regard to the panel touch position, the touch panel drive IC 11 performs the primary search (state1) using the main detection lines. Of the plurality of main detection lines, the touch position is around the main detection line having greatest change in capacitance. FIG. 6 shows a case where the main detection line having greatest change in capacitance is one of the main detection lines $M_{j-1}$ and $M_j$. During the primary search (state1), the touch panel drive IC 11 sequentially applies a drive pulse to the plurality of scanning lines and detects a current flowing in the main detection lines to determine the main detection line having greatest change in capacitance. When change in capacitance of the main detection line $M_j$ is equal to change in capacitance of the main detection line $M_{j-1}$ ($M_{j-1}=M_j$), the touch panel drive IC 11 determines that the panel touch position is at the point (4). In this case, the touch panel drive IC 11 may further perform the secondary search. When change in capacitance of the main detection line $M_j$ is equal to change in capacitance of the main detection line $M_{j-1}$, this strictly means that the difference between change in capacitance of the main detection line $M_j$ and change in capacitance of the main detection line $M_{j-1}$ is within a predetermined range. When change in capacitance of the main detection line $M_j$ is greater than change in capacitance of the main detection line $M_{j-1}$ ($M_{j-1}<M_j$), it is considered that the panel touch position is closest to the main detection line $M_j$ compared to the other main detection line. In this case, the touch panel drive IC 11 performs the search "state3" using the even sub-detection lines as the secondary search. When change in capacitance of the left-side even sub-detection wire SLC is equal to change in capacitance of the right-side even sub-detection wire SLD (SLC=SLD), the touch panel drive IC 11 determines that the panel touch position is at the point (1). Similarly, when change in capacitance of the left-side even sub-detection wire SLC is greater than change in capacitance of the right-side even sub-detection wire SLD (SLC>SLD), the touch panel drive IC 11 determines that the panel touch position is at the point (2), and when change in capacitance of the left-side even sub-detection wire SLC is smaller than change in capacitance of the right-side even sub-detection wire SLD (SLC<SLD), the touch panel drive IC 11 determines that the panel touch position is at the point (3). During the primary search (state1), when change in capacitance of the main detection line $M_{j-1}$ is greater than change in capacitance of the main detection line $M_j$ ($M_{j-1}>M_j$), the touch panel drive IC 11 performs the search "state2" using the odd sub-detection lines as the secondary search. Then, the touch panel drive IC 11 determines the panel touch position from the magnitude relationship between change in capacitance of the left-side even sub-detection wire SLC and change in capacitance of the right-side even sub-detection wire SLD. Although the flowchart showing the panel touch position detection control method shown in FIG. 6 shows control of single detection of the panel touch position, this control is repeated periodically, thereby enabling dynamic detection of panel touch. When one of change in capacitance of the main detection line $M_j$ and change in capacitance of the main detection line $M_{j-1}$ is greater than the other, this strictly means that one is greater than the other and the difference is greater than the predetermined range.

In the touch panel substrate according to the related art shown in FIG. 8, the detection resolution is 5.0 mm which is the pitch of the detection lines, and detection of panel touch with the finger is possible. However, when a small figure or line is drawn with a stylus pen, higher detection resolution is required, and in the touch panel substrate according to the related art shown in FIG. 8, it is difficult to perform detailed panel touch position detection when the contact area with the panel by the stylus pen is small. Meanwhile, in the touch panel substrate 10 according to this embodiment shown in FIG. 4, position detection of panel touch with the stylus pen is possible only by adding four detection wires which are led to the outside. In particular, in this embodiment, the touch panel substrate 10 is most suitable for a display device for a smart phone having a highly restrictive appearance or the like. During detection, the detection wires which do not perform a detection operation are placed in the Hi-Z state, making it possible to improve detection resolution while maintaining detection sensitivity in the related art. Since a complicated software process which is required in the related art in order to further improve detection resolution is not required, reduction in system scale is possible. A device on which panel touch is made may be conductive, a dedicated stylus pen having a special function or the like is not required, and a component configuration is the same as the panel touch substrate using the projection electrostatic capacitance system of the related art.

The touch panel-equipped display device 1 according to this embodiment has been described. In the touch panel substrate according to this embodiment, the left-side sub-detection lines and the right-side sub-detection lines are provided on both sides of the main detection lines. That is, although the right-side sub-detection line $S_{j-1}R$ is the sub-detection line of the main detection line $M_{j-1}$ and the left-side sub-detection line $S_jL$ which is the sub-detection line of the main detection line $M_j$ are arranged between two adjacent main detection lines $M_{j-1}$ and $M_j$, of course, the invention is not limited thereto.

For example, only one sub-detection line may be arranged between two adjacent main detection lines. In this case, when j is an odd number, the sub-detection line which is arranged on the left side of the odd main detection line (main detection line $M_j$, first main detection line) is the left-side odd sub-detection line (left-side sub-detection line $S_jL$, first one-side sub-detection line), and the sub-detection line which is arranged on the right side is the right-side odd sub-detection line (right-side sub-detection line $S_jR$, first other-side sub-detection line). It is desirable that the sub-detection line is arranged so as to equally divide internally the two main detection lines arranged on both sides, and in this case, each sub-detection line is arranged to include the center of each of the two main detection lines. During panel touch position detection, first, the touch panel drive IC 11 performs the primary search using the main detection lines. In a first case, it is assumed that the panel touch position is detected around the odd main detection line (main detection line $M_j$). Next, the touch panel drive IC 11 performs the search state2 using the sub-detection line as the secondary search. When change in capacitance of the left-side odd sub-detection wire SLA is equal to change in capacitance of the right-side odd sub-detection wire SLB (SLA=SLB), the touch panel drive IC 11 determines that the panel touch position is near the center of the main detection line $M_j$. When change in capacitance of the left-side odd sub-detection wire SLA is greater than change in capacitance of the right-side odd sub-detection wire SLB (SLA>SLB), the touch panel drive IC 11 determines that the panel touch position is on the left side of the main detection line $M_j$. When change in capacitance of the left-side odd sub-detection wire SLA is smaller than change in capacitance of the right-side odd sub-detection wire SLB (SLA<SLB), the touch panel drive IC 11 determines that the panel touch position is on the right side of the main detection line $M_j$. Meanwhile, in a second case, it is assumed that the panel touch position is detected around the (j−1)th even main detection line (main detection line $M_{j-1}$) by the primary search. Similarly to the first case, the touch panel drive IC 11 performs the search state2 using the sub-detection lines as the secondary search. When change in capacitance of the left-side odd sub-detection wire SLA is equal to change in capacitance of the right-side odd sub-detection wire SLB (SLA=SLB), the touch panel drive IC 11 determines that the panel touch position is near the center of the main detection line $M_{j-1}$. When change in capacitance of the left-side odd sub-detection wire SLA is greater than change in capacitance of the right-side odd sub-detection wire SLB (SLA>SLB), the touch panel drive IC 11 determines that the panel touch position is on the right side of the main detection line $M_{j-1}$. When change in capacitance of the left-side odd sub-detection wire SLA is smaller than change in capacitance of the right-side odd sub-detection wire SLB (SLA<SLB), the touch panel drive IC 11 determines that the panel touch position is on the left side of the main detection line $M_{j-1}$. In a third case, it is assumed that, during the primary search, when change in capacitance of the main detection line $M_j$ is equal to change in capacitance of the main detection line $M_{j-1}$ ($M_{j-1}=M_j$), the touch panel drive IC 11 determines that the panel touch position is near the center of each of the main detection line $M_{j-1}$ and the main detection line $M_j$. In a display device including a touch panel substrate, in which only one sub-detection line is arranged between two adjacent main detection lines, it is possible to detect the panel touch position by a simple control method, to provide a wider gap between adjacent main detection line and sub-detection line, and to secure detection sensitivity compared to the touch panel-equipped display 1 according to the foregoing embodiment shown in FIG. 4.

In the foregoing embodiment, although a set of (two) sub-detection lines are provided for each main detection line, two or more sets of (four or more) sub-detection lines may be provided. For example, when two sets (an inner-side set and an outer-side set) of sub-detection lines are provided for each main detection line, four sub-detection lines in total are provided between two adjacent main detection lines, and it is desirable that the four sub-detection lines are arranged to equally divide internally between the two adjacent main detection lines. During panel touch position detection, first, the touch panel drive IC 11 performs the primary search using the main detection lines. For example, it is assumed that the panel touch position is detected around the j-th main detection line $M_j$. Next, the touch panel drive IC 11 performs the secondary search using the sub-detection lines. During the secondary search, for example, a search may be performed using the inner-side set of left-side sub-detection line and right-side sub-detection line, and a search may be performed using the outer-side set of left-side sub-detection line and right-side sub-detection line. In a display device including a touch panel substrate, in which two sets of sub-detection lines are arranged for each main detection line, it is possible to realize further improvement of detection resolution compared to the touch panel-equipped display 1 according to the foregoing embodiment shown in FIG. 4.

In any case, during the primary search in which panel touch is detected using the main detection lines, it is desirable that the touch panel drive IC places the sub-detection line, which do not perform a detection operation, in the high impedance state. During the secondary search in which panel touch is detected using the sub-detection lines, it is desirable that the main detection lines and the sub-detection lines not used for detection are placed in the high impedance state. During the search "state2" in the foregoing embodiment, although a search is performed using both of the left-side odd sub-detection line and the right-side odd sub-detection line, the invention is not limited thereto, and a search may be performed in order using only one of the left-side odd sub-detection line and the right-side odd sub-detection line. Also in this case, when detecting panel touch, it is desirable that the touch panel drive IC places the main detection lines and the sub-detection lines not used for detection in the high impedance state.

Although the invention is most suitable for an in-cell touch panel-equipped display device, the invention is not limited to the in-cell type, and may be applied to other internal touch panel-equipped display devices, such as an on-cell type or may be applied to an external touch panel-equipped display device. Although a display device according to the invention is most suitable for an IPS system liquid crystal display, the invention is not limited thereto, and other display devices, such as an organic EL display device, may be used.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A touch panel-equipped display device comprising:
   a plurality of scanning lines, overlapping a display region in plan view, extending in a first direction, and being arranged in a second direction intersecting the first direction;
   a plurality of detection lines, overlapping the display region in plan view, intersecting the plurality of scanning lines in a three-dimensional manner, extending in the second direction, and being arranged in the first direction,
   a drive circuit, being electrically connected with the plurality of detection lines respectively;
   a plurality of first connecting wiring;
   a plurality of second connecting wiring;
   a third connecting wiring; and
   a fourth connecting wiring,
   wherein the plurality of detection lines include a plurality of first main detection lines, a plurality of second main detection lines, a plurality of first one-side sub-detection lines, and a plurality of first other-side sub-detection lines,
   each of the plurality of first main detection lines is electrically connected with the drive circuit by a corresponding first connecting wiring,
   each of the plurality of second main detection lines is arranged between adjacent first main detection lines and is electrically connected with the drive circuit by a corresponding second connecting wiring,
   the plurality of first one-side sub-detection lines are electrically connected together by the third connecting wiring,
   each of the plurality of first one-side sub-detection lines is arranged between the corresponding first main detection line and the second main detection line adjacent to one side of the corresponding first main detection line,
   the plurality of first other-side sub-detection lines are electrically connected together by the fourth connecting wiring,
   each of the plurality of first other-side sub-detection lines is arranged between the corresponding first main detection lines and the second main detection line adjacent to the other side of the corresponding first main detection line, and
   the third connecting wiring and the fourth connecting wiring intersect the plurality of first connecting wirings and the plurality of second connecting wirings in a three-dimensional manner and are electrically connected with the drive circuit.

2. The display device according to claim 1, further comprising:
   a fifth connecting wiring; and
   a sixth connecting wiring,
   wherein the plurality of detection lines further include a plurality of second one-side sub-detection lines and a plurality of second other-side sub-detection lines,
   the plurality of second one-side sub-detection lines are electrically connected together by the fifth connecting wiring,
   each of the plurality of second one-side sub-detection lines is arranged between the corresponding second main detection lines and the first other-side sub-detection line adjacent to one side of the corresponding second main detection line,
   the plurality of second other-side sub-detection lines are electrically connected together by the sixth connecting wiring, and
   each of the plurality of second other-side sub-detection lines is arranged between the corresponding second main detection lines and the first one-side sub-detection line adjacent to the other side of the corresponding second main detection line.

3. The display device according to claim 1,
wherein the drive circuit is electrically connected to the plurality of scanning lines and drives the plurality of scanning lines and the plurality of detection lines to detect panel touch,
when panel touch is detected using the plurality of first main detection lines and the plurality of second main detection lines, the drive circuit places the plurality of sub-detection lines in a high impedance state.

4. The display device according to claim 1,
wherein the drive circuit is electrically connected to the plurality of scanning lines and the plurality of detection lines and drives the plurality of scanning lines and the plurality of detection lines to detect panel touch,
when panel touch is detected using the plurality of first one-side sub-detection lines and/or the plurality of first other-side sub-detection lines, the drive circuit places the plurality of main detection lines and the plurality of sub-detection lines not used for detection in a high impedance state.

5. The display device according to claim 2,
wherein the drive circuit is electrically connected to the plurality of scanning lines and drives the plurality of scanning lines and the plurality of detection lines to detect panel touch,
when panel touch is detected using the plurality of second one-side sub-detection lines and/or the plurality of second other-side sub-detection lines, the drive circuit places the plurality of main detection lines and the plurality of sub-detection lines not used for detection in a high impedance state.

6. A display device comprising:
a first substrate having a plurality of common electrodes, extending in a first direction and being arranged in a second direction intersecting the first direction;
a second substrate having a plurality of detection electrodes, intersecting the plurality of common electrodes in a three-dimensional manner, extending in the second direction, and being arranged in the first direction;
a drive circuit, being electrically connected with the plurality of common electrodes and the plurality of detection electrodes;
a first sub-detection wire;
a second sub-detection wire;
a third sub-detection wire; and
a fourth sub-detection wire,
wherein the plurality of detection electrodes include a plurality of first main detection electrodes, a plurality of second main detection electrodes, a plurality of first left-side sub-detection electrodes, a plurality of first right-side sub-detection electrodes, a plurality of second left-side sub-detection electrodes, and a plurality of second right-side sub-detection electrodes,
each of the first left-side sub-detection electrodes is formed on the left side of the corresponding first main detection electrodes,
each of the first right-side sub-detection electrodes is formed on the right side of the corresponding first main detection electrode,
each of the second left-side sub-detection electrodes is formed on the left side of the corresponding second main detection electrode,
each of the second right-side sub-detection electrodes is formed on the right side of the corresponding second main detection electrode,
the plurality of detection electrodes are repetitively arranged in an order of the first left-side sub-detection electrode, the first main detection electrode, the first right-side sub-detection electrode, the second left-side sub-detection electrode, the second main detection electrode, and the second right-side sub-detection electrode,
the plurality of first left-side sub-detection electrodes are electrically connected together and with the drive circuit by the first sub-detection wire,
the plurality of first right-side sub-detection electrodes are electrically connected together and with the drive circuit by the second sub-detection wire,
the plurality of second left-side sub-detection electrodes are electrically connected together and with the drive circuit by the third sub-detection wire, and
the plurality of second right-side sub-detection electrodes are electrically connected together and with the drive circuit by the fourth sub-detection wire.

7. The display device according to claim 6,
wherein the drive circuit includes a first input terminal which is connected to the first sub-detection wire and is in a high impedance state, and
a second input terminal which is connected to the second sub-detection wire and is in a high impedance state.

8. The display device according to claim 6,
wherein the drive circuit includes
a first input terminal which is connected to the first sub-detection wire,
a second input terminal which is connected to the second sub-detection wire,
a third input terminal which is connected to the third sub-detection wire, and
a fourth input terminal which is connected to the fourth sub-detection wire,
in a first state, the first input terminal and the second input terminal are in a high impedance state, and
in a second state, the third input terminal and the fourth input terminal are in a high impedance state.

9. The display device according to claim 6, further comprising:
floating electrodes, being formed between the adjacent first main detection electrode and second main detection electrode.

* * * * *